Patented Feb. 14, 1939

2,147,238

UNITED STATES PATENT OFFICE 2,147,238

SOLIDIFIED FRUIT AND METHOD OF PRODUCING SAME

Thomas Alvin Bruce, San Mateo, Calif., assignor, by mesne assignments, to Corn Products Refining Company, New York, N. Y., a corporation of New Jersey No Drawing. Application December 22, 1937, Serial No. 181,147

11 Claims. (Cl. 99—155)

This invention relates to the treatment of fruit, particularly fruit juice, to reduce the same to a substantially solid state in which form the keeping qualities are improved and the product is more readily adapted for commercial handling.

One of the objects of the invention is to provide a relatively dry fruit product containing all, or substantially all, of the solids of the fruit juice and having the natural flavor of the fruit.

A further object of the invention is to provide a fruit product of the type described which can be readily handled and stored and which possesses good keeping qualities.

Another object is to preserve fruit by means other than the relatively expensive cold pack processes or the dehydrating processes, heretofore employed.

Another object is to provide an improved method of preserving fruit whereby the desired result is obtained economically and with a minimum of operations and ingredients.

Other objects and purposes will more fully appear from the following detailed description of the invention wherein is set forth several examples illustrating various embodiments of the invention.

The invention consists, briefly, in supersaturating the fruit juice with dextrose and permitting the supersaturated solution to crystallize to a solid or substantially solid form.

It has been found that the low solubility of dextrose renders it particularly adaptable for this purpose for the reason that relatively small amounts will produce the desired degree of supersaturation, other commercial sugars being unsuitable because of their higher solubility. The amount of dextrose employed for this purpose will vary from approximately one-half to twice the weight of the juice being treated, depending upon the type of product desired and the type of fruit used. No particular form of dextrose is necessary as the invention does not contemplate crystallization of the dextrose in any definite crystalline form. In most cases the ultimate crystalline form of the dextrose in the finished product will probably be a mixture of hydrate and anhydrous crystals clustered together but the matter of ultimate crystalline form is of no consequence in connection with the present invention. The supersaturation, as will hereinafter more fully appear, may be effected by heating, by vacuum removal of some of the water of the mixture or by a combination of these two expedients.

The following examples are purely by way of illustration as the invention, obviously, is not limited thereto.

Example 1.—To one hundred pounds of orange juice (which will ordinarily contain approximately 20% solids and 80% water) add 150 to 200 pounds of cerelose (high purity dextrose hydrate) and agitate the mixture at a temperature between 120° and 150° Fahrenheit, preferably 140° F., until the dextrose is dissolved. When the dextrose is dissolved, allow the mixture to cool, preferably to about 70° F., then seed with 1%–2% dry dextrose and allow the mixture to solidify in suitable pans.

The resultant product may then be ground, shaved, pulverized, or cut into any desired shape for commercial uses.

The temperatures employed may be varied somewhat from the ranges stated, the sole reason for using elevated temperatures being to increase the rate of solution and for bringing about a higher concentration of dextrose in the syrup phase.

Example 2.—To one hundred pounds of orange juice add 100 pounds of cerelose and subject the mixture to prolonged stirring at a temperature of 80–100° F. When the dextrose is dissolved, process the mixture in any suitable vacuum evaporator to a point of supersaturation. The supersaturated mixture may then be cooled, seeded and crystallized, as in Example 1.

This example is particularly adapted for treatment of fruit juices which are adversely affected by elevated temperatures. With many fruit juices this method will produce a fruit product of somewhat better flavor than that produced under Example 1.

Here, again, the only object in the use of vacuum is to increase the fruit solids-dextrose ratio, there being no critical factor in the amount of vacuum employed or the extent of the treatment.

Example 3.—To one hundred pounds of orange juice, add 50 pounds of dextrose, and agitate the mixture at a temperature between 120°–150° F. until the dextrose is dissolved. Then process the mixture in a vacuum evaporator to remove approximately 30–50% of water, by weight, or down to a weight of from 70 to 100 pounds and allow the supersaturated mixture to solidify.

With this treatment the residual moisture will be less than 10%, yielding a solid mass particularly adapted for pulverizing or granulating.

Although the above examples are directed to the treatment of orange juice, the invention may be applied in like manner to other juices, such as lime, lemon, prune or berry, and also to whole fruit, mashed or ground fruit, or parts of fruit and the term "fruit juice" as used herein and in the claims appended hereto, is used, unless otherwise specified, in a broad sense to include the substances of the type enumerated.

The product of the present invention may be utilized for many purposes. In the case of solidified juices, using the term in the narrower sense, the product may be diluted to provide a refreshing beverage, or utilized to make gelatine desserts, sherbets, ices, ice-cream and the like. In the case of solidified whole fruit or parts of fruit, such as prunes, peaches, apricots and the like, the product is suitable for the preparation of jams or jellies. Dextrose, because of its low sweetening power does not overpower or dominate the delicate flavor of the fruit and, for this reason, the product is particularly adaptable for many commercial uses.

In each case it is highly preferable to reduce the moisture content of the product to a point at which the solid content is sufficient to preserve the fruit or mixture without the aid of refrigeration. The degree of saturation should be sufficient to inhibit the growth of mold yeast or any microorganisms.

It is the intention to cover all modifications within the scope of the following claims.

I claim:

1. Method of treating fruit juice which comprises mixing dextrose with the fruit juice, removing water from the mixture and then solidifying the mixture by crystallization.

2. Method of treating fruit juice which comprises dissolving dextrose in the juice, treating the solution to supersaturate the same, and then solidifying the mixture by crystallization.

3. Method of treating fruit juice which comprises dissolving dextrose in the juice, heating the solution to supersaturate the same and then cooling the solution to crystallize the same.

4. Method of treating fruit juice which comprises mixing dextrose with the juice in amounts from one-half to twice that of the juice, by weight, removing water from the mixture to supersaturate the same, and then solidifying the mixture by crystallization.

5. Method of treating fruit juice which comprises dissolving dextrose in the juice, supersaturating the solution by heating and by vacuum removal of water, and then treating the supersaturated solution to solidify the same by crystallization.

6. Method of treating fruit juice which comprises mixing substantially 100 pounds of fruit juice with substantially 175 pounds of cerelose at a temperature between 120°–150° F. until the dextrose is dissolved, then cooling to room temperature, seeding with a small amount of dextrose and allowing the mass to crystallize to a solid state.

7. Method of treating fruit juice which comprises mixing substantially 100 pounds of fruit juice with substantially an equal amount, by weight, of cerelose and subjecting the mixture to prolonged stirring at about 80–100° F., processing the mixture in a vacuum evaporator to a point of supersaturation, seeding the supersaturated mixture and crystallizing the same to a solid state.

8. Method of treating fruit juice which comprises mixing substantially 100 pounds of fruit juice with substantially 50 pounds of dextrose at a temperature between 120–150° F., processing the heated mixture in a vacuum evaporator down to a weight of from 70–100 pounds, then cooling the supersaturated mixture to solidify the same.

9. Method of treating fruit juice which comprises mixing fruit juice with from one-half to twice the amount by weight of dextrose, agitating the mixture until the dextrose is dissolved in the fruit juice and supersaturating the mixture by removal of water therefrom so that the residual moisture content of the mixture, after crystallization, will be less than 10 per cent.

10. A composition of matter comprising crystallized dextrose having the solids of a fruit juice adhering to the crystals throughout the mass.

11. A composition of matter comprising an intimate mixture of crystallized dextrose and fruit juice having a moisture content of less than 10%.

THOMAS ALVIN BRUCE.